United States Patent [19]
Edwards

[11] Patent Number: 6,062,458
[45] Date of Patent: May 16, 2000

[54] COMPENSATED BALANCE MOUNTING FOR FASTENER APPLICATOR

[75] Inventor: Cyril Kenneth Edwards, Leicester, United Kingdom

[73] Assignee: Ariel Industries PLC, Leicester, United Kingdom

[21] Appl. No.: 08/683,251

[22] PCT Filed: Jul. 6, 1993

[86] PCT No.: PCT/GB93/01420

§ 371 Date: Jul. 20, 1994

§ 102(e) Date: Jul. 20, 1994

[87] PCT Pub. No.: WO94/02267

PCT Pub. Date: Feb. 3, 1994

Related U.S. Application Data

[63] Continuation of application No. 08/204,383, Jul. 20, 1994, abandoned.

[30] Foreign Application Priority Data

Jul. 17, 1992 [GB] United Kingdom ................... 9215265

[51] Int. Cl.[7] .................................................. B21J 15/00
[52] U.S. Cl. .............................. 227/152; 227/55; 227/62; 29/243.53; 29/243.523
[58] Field of Search ............................... 227/152, 51–56, 227/59, 61, 62; 79/243.523, 243.524, 243.53; 93/579, 559, 642

[56] References Cited

U.S. PATENT DOCUMENTS

| | | |
|---|---|---|
| 3,534,896 | 10/1970 | Speller et al. ............................ 227/51 |
| 3,833,785 | 9/1974 | Roach . |
| 4,445,273 | 5/1984 | Van Brussel et al. . |
| 4,955,119 | 9/1990 | Bonomie et al. . |
| 4,966,323 | 10/1990 | Speller, Sr. et al. ...................... 227/51 |
| 5,231,747 | 8/1993 | Clark et al. .............................. 227/152 |

FOREIGN PATENT DOCUMENTS

| | | |
|---|---|---|
| 0 149 806 A2 | 12/1984 | European Pat. Off. . |
| 0 338 117 A2 | 8/1988 | European Pat. Off. . |
| 0 386 590 A1 | 2/1990 | European Pat. Off. . |
| 2 619 043 | 8/1987 | France . |
| 3916014 A1 | 11/1990 | Germany . |
| 0 472 889 A1 | 7/1991 | Germany . |
| 2 144 711 | 7/1984 | United Kingdom . |

*Primary Examiner*—Rinaldi I. Rada
*Assistant Examiner*—Boyer Ashley
*Attorney, Agent, or Firm*—Lackenbach Siegel Marzullo Aronson & Greenspan

[57] ABSTRACT

A mounting mechanism for mounting a fastener applicator on a positioning mechanism. The mounting mechanism incorporates fluid actuators for applying compensating forces and turning moments that counteract the effects of the applicator weight by bringing the forces and turning moments into substantial equilibrium or predetermined directional bias so that the applicator is movable by a minimal force. The fluid actuators thereby enabling final correction of the applicator position and orientation prior to fastener application by movement of the fastener applicator relative to the position mechanism as a result of contact between the applicator and the workpiece.

6 Claims, 2 Drawing Sheets

COMPENSATED BALANCE MOUNTING FOR FASTENER APPLICATOR

This application is a continuation of application Ser. No. 08/204,383, filed Jul. 20, 1994 now abandoned.

BACKGROUND OF THE INVENTION

1. Field of the Invention

This invention relates to the positioning a mobile fastener applicator with respect to a workpiece and is particularly, but not exclusively, concerned with automated fastener application and the robotic presentation of an applicator to a workpiece.

The term workpiece is used herein to embrace one or more workpiece elements to be fastened together.

2. Description of the Prior Art

Robotic and like devices are capable of bringing an applicator precisely into a predetermined position, but normally have no means of subsequently adjusting that position if the workpiece is not equally precisely positioned.

Hence, there is a requirement for a mechanism which, immediately prior to applying a fastener, affords the applicator freedom of ultimate positional adjustment, to accommodate workpiece positional variation.

Another requirement of automated application systems is a short fastener application operating cycle time capability.

In order to achieve this, both a fastener driving plunger and opposed die of an applicator must be moved clear of an applied fastener (and dear any material, eg metal, displaced during the fastening cycle) immediately the fastener has been applied—so that the applicator is free to move to the next fastening position without delay.

A further requirement of such automated application systems is a capability, without risk of workpiece damage, of bringing the applicator into contact with some datum point on a workpiece, for optimal fastener positioning.

An example of this requirement is shown in FIG. 3A, in which fasteners are to be applied to join the flange sections 35 of two sheet metal pressings 36.

If the precise position of the main body of the pressings 36 is uncertain, it would be dangerous for the robot to bring the applicator in to its final position under power.

Rather, there is a need for a subsidiary mechanism which can take over the positioning of the applicator when the robot has brought it to the nearest safe position and can then bring it gently into contact with the main body of the pressings 36.

In this way, the flange 35 width can be kept to a minimum and a fastener (not shown) can be positioned in its most effective position, immediately adjacent to the main body of the pressings 36.

Hitherto known automated or robotic positional devices may generally perform satisfactorily when workpieces are correctly positioned, or can be forced into the correct position without damage.

However, there are many workpieces, such as the pressed steel sections used in the construction of motor vehicles and domestic appliances, which cannot be manufactured economically with the positional accuracy necessary for optimum fastening.

In such cases, the use of rigid fastening devices can lead to workpiece damage—unless the workpiece is enlarged, to allow greater tolerance in the positioning of fastening points.

A conventional solution has been to mount the applicator on a spring system, which allows a certain amount of applicator movement relative to a robot mounting arm.

However this approach has serious limitations—in that any given spring system can hold an applicator in equilibrium only in any one orientation. Accordingly, if fasteners have to be applied in more than one plane, a spring-based system is inappropriate.

Furthermore, a typical applicator can weigh from 20–50 kgs, requiring heavy springing to support it—and consequently relatively high forces and torques to reposition it.

The workpieces have to be clamped between the fastener delivery nose and opposed setting die of the applicator, prior to the fastener being applied.

Both the nose and the die are normally small in diameter, in order to facilitate access to the fastening points, and hence can generate high positioning torques only by exerting on the workpiece loads which may cause surface damage.

SUMMARY OF INVENTION

According to the invention there is provided a compensated balance mounting for a fastener applicator to accommodate positional and orientation adjustment with respect to a workpiece to which a fastener is to be applied, including compensator means for counteracting the effects of the applicator mounted weight, by bringing the attendant mounting forces and turning moments into either substantial equilibrium, or a predetermined directional bias, whereby, upon encountering a workpiece, ultimate adjustment of the applicator position and orientation can be dictated by the workpiece position and orientation, with minimal exertion thereupon and thereby with minimal contact damage thereto.

Such a mounting can be programmed to support an applicator at or near equilibrium in any required orientation.

In this context the term "equilibrium" is used to denote a condition wherein forces and turning moments attendant the applicator mounted weight are balanced by equal and opposite forces and turning moments, so that the applicator is free at each fastening point to "float" into the correct orientation relative to the workpiece.

Programmability to support an applicator in equilibrium can also be adapted to cause the applicator to move gently in any direction, by contriving the forces to be slightly out of equilibrium.

In practice, the compensator means is desirably capable of applying positioning and compensating forces and/or turning moments about the point of application of a fastener to a workpiece. This obviates skidding contact with the workpiece.

Embodiments of the present invention may utilise independently operable fluid, such as hydraulic or pneumatic piston-in-cylinder, actuators to apply forces and turning moments to an applicator, along and around each of three mutually orthogonal axes in order to achieve mounting equilibrium or near equilibrium.

By mounting the applicator on supports which allow limited movement and rotation along and around these axes, relative to a robot support arm, appropriate pressures can be applied to each actuator cylinder, in order achieve equilibrium for any orientation of the applicator.

When the applicator is in equilibrium, the forces and turning moments required to adjust its position are minimal. Hence the applicator can readily be brought into the precise ultimate position required, prior to applying a fastener.

Similarly, immediately after applying a fastener, the applicator can readily be brought to a position where it is free to move quickly to the next fastening position.

Furthermore, the applicator can be brought safely into contact (or near contact) with some workpiece datum.

Other aspects of the invention embrace a compensated balance mounting in combination with a hydraulic applicator nose in which independent actuators are employed to effect workpiece clamping movement of a fastener delivery nose and fastener driving plunger movement for applying a fastener through the delivery nose to the workpiece.

DESCRIPTION OF PREFERRED EMBODIMENTS

There now follows a description of some particular embodiments of the invention, by way of example only, with reference to the accompanying diagrammatic and schematic drawings, in which.

Figure 2:
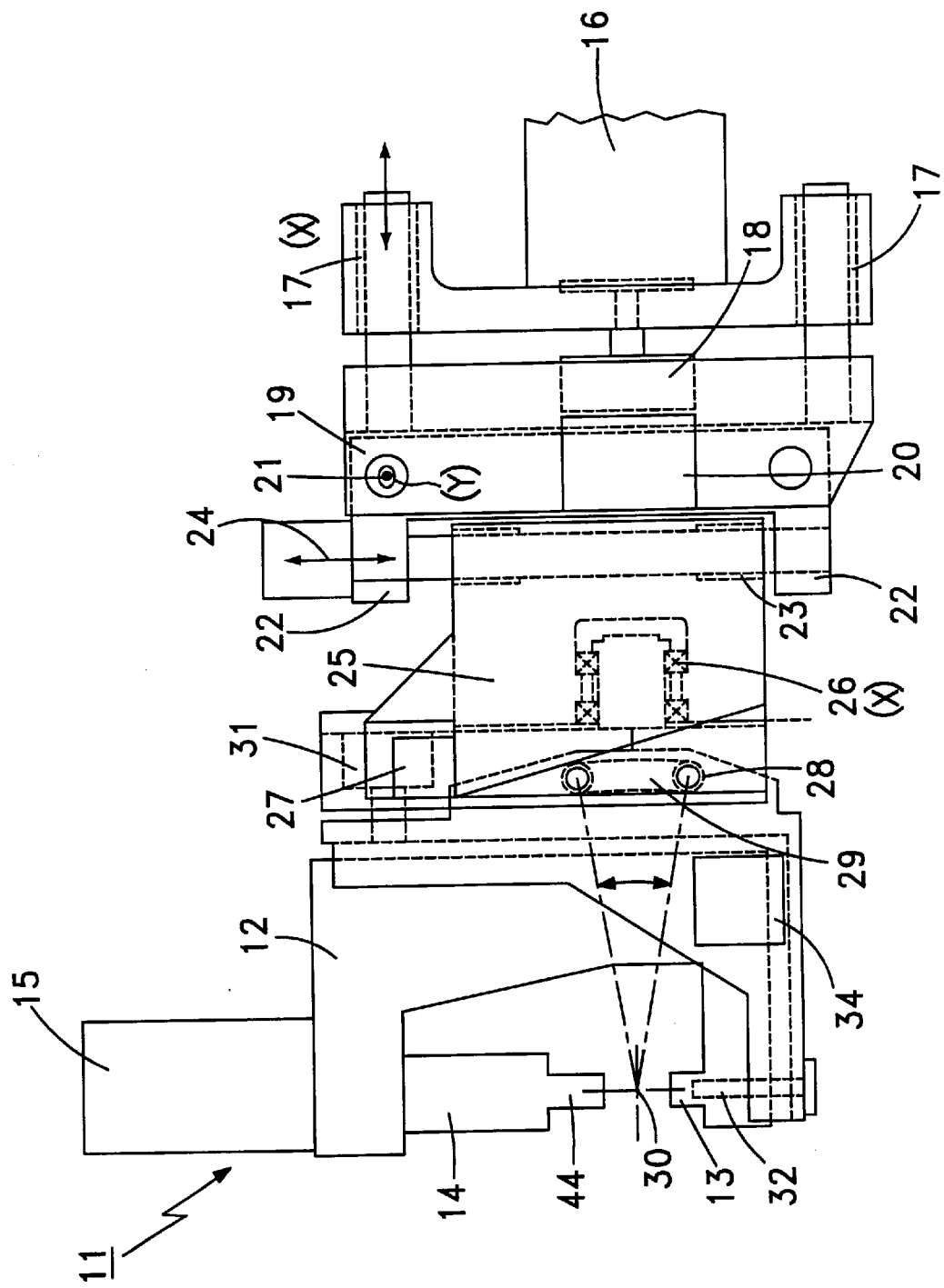
FIG. 2 shows a multiple (ie six) axis compensated balance mounting for a fastener applicator.

Referring to the drawings, and in particular FIG. 2, a fastener applicator 11 consists of a C frame 12, with a setting die 13 mounted on its (lower) arm and a fastener drive plunger mechanism 14, operated by a hydraulic actuator cylinder 15 mounted on its (upper) arm.

The driving plunger carries a hollow fastener delivery nose 44 at its (lower) end for workpiece (clamping) contact, reacting against the setting die 13 for turning the fastener end over into a fastening head, in the case of a rivet fastener.

The configuration is adapted for self-piercing rivets, for example of hollow tubular construction, but is generally applicable to diverse fastening applications.

Figure 1:
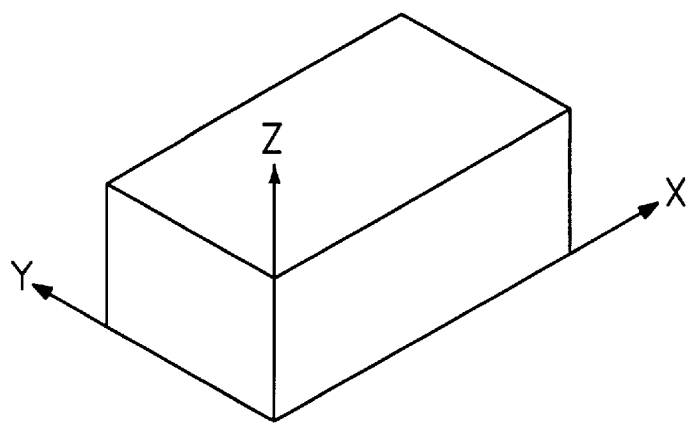
FIG. 1 shows the orthogonal reference axes for the movements of the compensator shown in the other Figures.

The applicator 11 is supported in a multiple (ie six) axis mounting, and is free to move (somewhat) along, or rotate about, each of the three orthogonal axes x y and z shown in FIG. 1.

More specifically, movement along the x axis is accommodated by linear bearings 17, and is controlled by a fluid actuator cylinder 18.

Similarly, movement along the y axis, within a U mounting frame 19, is accommodated by linear bearings 21, and is controlled by fluid actuator cylinder 20.

Finally, movement along the z axis, within U mounting frame 22, is accommodated by linear bearings 23, and is under the control of a fluid actuator cylinder 24.

Rotation of the applicator 11 about the x axis, and in particular about a fastening point 30, is accommodated by rotary bearings 26 in a U mounting frame 25, and is controlled by a fluid actuator cylinder 27.

Rotation about the y axis is accommodated by a radial slot 29 within a U frame 28, which allows the applicator 11 to rotate about the fastening point 30 when force is applied by a fluid actuator cylinder 31.

Rotation about the z axis, and through fastening point 30, is accommodated by bearings 32, and is controlled by a fluid actuator cylinder 34.

Should lesser freedom of movement be sufficient, the corresponding actuators and bearings may be omitted.

The overall assembly is mounted upon a robotic arm 16.

The successive U frames are co-operatively inter-coupled, so that U frame 28 is connected to U frame 25 which allows rotation about the x axis. U frame 25 is supported in turn within U frame 22, which allows the applicator freedom to move along the z axis.

Figures 3A, 3B:
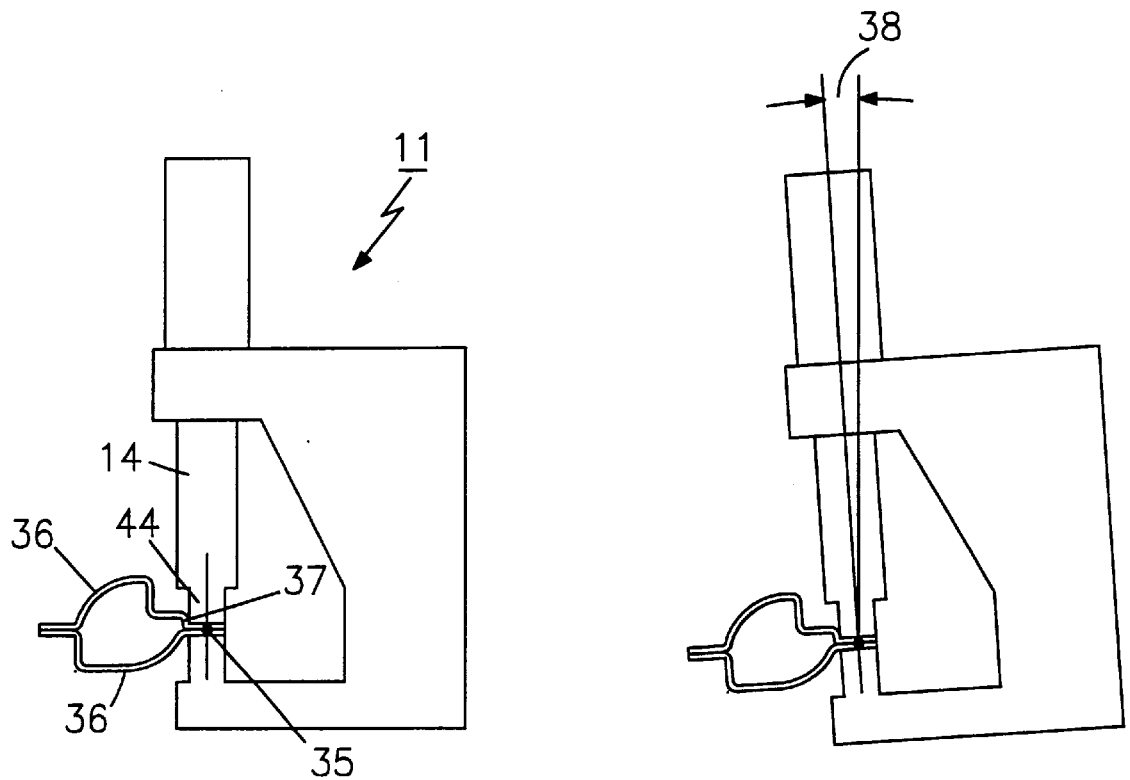
FIGS. 3A and 3B show successive workpiece alignment and fastener application operations.

As an example of how the mounting can be used in practice, FIG. 3A shows an applicator 11 with a nose 44 in position to apply fasteners to flanges 35 of workpiece elements 36 which ate not precisely horizontal.

In order to move into the correct position, the applicator has had to rotate about the y axis through angle 38.

In order to minimise skidding between the applicator 11 and the workpiece 36, it is important to arrange the various actuator mechanisms so that all the movements are centred upon the point of application 30 of a fastener to the workpiece.

Thus, the applicator 11 rotates about the fastening point 30 for all its angular movements and traverses through the fastening point 30 for all its linear movements.

A preferred configuration employs a clamping system (not shown) to hold the applicator 11 in a fixed position relative to the robot arm 16 during all movements to and from the fastening points.

By this means, high levels of acceleration and deceleration can be utilised, in order to minimise the travelling time between fastening locations.

Prior to arrival at the next fastening position, the fluid actuator cylinders are charged with the necessary operating pressures ready to hold the applicator in equilibrium in the orientation appropriate to that fastening position.

Upon arrival at the next fastening position, the clamps are released—leaving the applicator free to be brought, by workpiece contact, with minimal forces and turning moments, into the precise position required for applying the next fastener, without workpiece contact damage.

Immediately a fastener has been applied, the fluid pressures applied to the actuator cylinders can be modified, in order to effect speedy withdrawal of the applicator from the fastening position, prior to the clamping mechanism being re-applied, ready for rapid transfer to the next fastening position.

If the requirement is that the applicator 11 should be brought into contact with a shoulder 37 of a workpiece 36, such as shown in FIGS. 3A and 3B, the applicator 11 can be brought in a clamped mode to a safe proximal position.

Prior to arrival, the appropriate fluid actuator cylinders can be brought to the operating pressures required to cause the applicator to move gently towards the shoulder 37 of the workpiece 36, immediately the applicator is released from its clamps.

In practice, the actuators can be single or double acting cylinders or by matched pairs of opposed cylinders.

The term fluid embraces hydraulic liquid or pneumatic operation.

By mounting the applicator at or near equilibrium, in any orientation required for a given fastening programme, the present invention offers various advantages, namely:

1. The applicator can be correctly positioned relative to the workpiece with minimal force.
   Hence the workpiece itself can be used for final positional adjustment of the applicator, without being subjected to damaging contact force.
2. Workpiece design economies can be effected.
   For instance, if two metal pressings are to be joined along a flange, the flange width would normally have to be increased beyond the optimum, to allow for positional errors when presented for fastening.
   However, by allowing the applicator to be brought gently into contact with the workpiece immediately adjacent to the flange, the flange width can be the minimum required to accept a fastener, thus obviating superfluous material and promoting compact jointing.

3. A fastener can be applied in a position where it can be most effective.

For instance, if it is being applied to a flange, the nearer the fastening position is to the wall adjacent to the flange, the more effective the fastening.

4. High speed operation is facilitated by programmed control of the pressures applied to the actuator cylinders, in order to move the plunger and die clear of the fixtures rapidly, so that the applicator is free to move to the next fastening position without delay.

The compensated balance mounting described can be used in conjunction with the hydraulic nose assembly taught in our UK patent application no. 9215265.1 and corresponding PCT International Application No. PCT/GB93/01140.

This provides independent actuation of a workpiece clamping nose and a fastener driving plunger, promoting a more rapid fastener application cycle and accommodating workpiece positional errors, by ensuring clamping together of workpiece elements precedes fastener application, that is without relying upon the fastening action itself to bring together workpiece elements, with consequent risk of fastener mis-application.

Thus, a C-frame applicator such as that shown in FIGS. 2 and 3 may incorporate a hydraulic nose assembly with independent actuators for the (workpiece contacting) clamping nose and the fastener drive plunger in substitution for a conventional integrated nose and plunger assembly.

What is claimed is:

1. A mounting for positioning a fastener applicator on a positioning mechanism comprising:

a mounting mechanism for mounting the fastener applicator on the positioning mechanism in a manner such that the applicator is able to move to a limited extent with at least one degree of freedom of movement relative to the positioning mechanism for accommodating at least one of positional and orientational discrepancies between the applicator and a workpiece to which a fastener is to be applied; and at least one fluid actuator means for applying a load in respect of said at least one degree of freedom of movement to a portion of the mounting mechanism which is movable with the applicator in a direction of said degree of freedom of movement and for at least partly balancing, wit the load, the gravitational effects of a mass of the applicator in the direction of said degree of freedom of movement, the applied load being such that a net force and turning moment in the sense of said degree of freedom of movement is in substantial equilibrium so that the applicator is movable by a minimal force in the direction of said degree of freedom of movement, said at least one fluid actuator means thereby enabling final correction of the applicator position and orientation prior to fastener application by movement of the applicator relative to the positioning mechanism in the direction of the at least one degree of freedom of movement as a result of contact between the applicator and the workpiece.

2. A mounting as claimed in claim 1, further comprising means for applying the load to the mounting mechanism by said at least one fluid actuator means after fastener application, to move said fastener applicator clear of the workpiece.

3. A mounting as claimed in claim 1, including locking means for locking said at least one fluid actuator means and thus the mounting mechanism in relation to the positioning mechanism, during robotic pre-positioning, and releasing said at least one fluid actuator means and mounting mechanism after robotic pre-positioning and prior to final correction.

4. A mounting for positioning a fastener applicator on a positioning mechanism comprising:

a mounting mechanism for mounting the fastener applicator on the positioning mechanism in a manner such that the applicator is able to move to a limited extent with at least one degree of freedom of movement relative to the positioning mechanism for accommodating at least one of positional and orientational discrepancies been the applicator and a workpiece to which a fastener is to be applied; and at least one fluid actor means for applying a load in respect of said at least one degree of freedom of movement to a portion of the mounting mechanism which is movable with the applicator in a direction of said degree of freedom of movement and for at least partly balancing, with the load, the gravitational effects of a mass of the applicator in the direction of said degree of freedom of movement, the applied load being such that a predetermined directional bias in the direction of said degree of freedom of movement is provided, so that the applicator is movable by a minimal force in the direction of said degree of freedom of movement, said at least one fluid actuator means thereby enabling final correction of the applicator positioning and orientation prior to fastener application by movement of the applicator relative to the positioning mechanism in the direction of the at least one degree of freedom of movement as a result of contact between the applicator and the workpiece.

5. A mounting as claimed in claim 4, further comprising means for applying the load to the mounting mechanism by said at least one fluid actuator means after fastener application, to move said fastener applicator clear of the workpiece.

6. A mounting as claimed in claim 4, including locking means for locking said at least one fluid actuator means and thus the mounting mechanism in relation to the positioning mechanism, during robotic pre-positioning, and releasing said at least one fluid actuator means and mounting mechanism after robotic pre-positioning and prior to final correction.

\* \* \* \* \*